United States Patent [19]

Meller

[11] 4,122,710
[45] Oct. 31, 1978

[54] COURSE TO WIND GUIDANCE DEVICE

[76] Inventor: Ian V. Meller, 200 Rideau Ter., Apt. 617, Ottawa, Ontario, Canada

[21] Appl. No.: 856,686

[22] Filed: Dec. 1, 1977

[51] Int. Cl.² ............................................. G01C 21/00
[52] U.S. Cl. ..................................... 73/178 R; 73/188
[58] Field of Search ...................... 73/178 R, 180, 188; 364/424, 510

[56] References Cited

U.S. PATENT DOCUMENTS

| | | | |
|---|---|---|---|
| 3,727,457 | 4/1973 | Gregory | 73/188 |
| 4,078,425 | 3/1978 | Busch et al. | 73/188 |

Primary Examiner—Jerry W. Myracle

[57] ABSTRACT

A guiding device for guiding the helmsman of a sailing vessel in steering a preset course relative to the apparent wind. The device employs a course selector a single setting of which presets the desired course to wind for both the port and starboard tacks. The device comprises a wind vane disposed at the top of the mast of the vessel and a guiding instrument at deck level. The guiding instrument signals the on-course condition by a state of balance and deviations from on-course by deviations from balance.

8 Claims, 6 Drawing Figures

COURSE TO WIND GUIDANCE DEVICE

BACKGROUND OF THE INVENTION

The present invention relates to course-to-steer guiding devices for sailing vessels and the like.

The invention provides a centered on-course indication and steer left or right commands, by responding to which the helmsman may maintain the sailing vessel on a preset angle relative to the apparent wind. The invention also accurately detects and indicates the head to wind condition.

It is a characteristic of sailboats that, for any wind strength and sea state, maximum speed made good to windward is achieved on two courses. These two optimum courses are symmetric with respect to the direction of the wind and occur, on high performance sailing vessels, at approximately 30 degrees relative to the apparent wind. Since sailing at angles other than the optimum courses results in lower speed made good, it is particularly important during racing to be able to very rapidly make heading adjustments in response to wind shifts, in order to hold the optimum course (port or starboard) as consistently as possible and for as large a fraction of race time as possible.

In prior art devices wind vanes coupled to remote reading indicators have been used to display to the helmsman the direction of the apparent wind relative to the center line of the sailing vessel. On seeing a change in time displayed angle, the helmsman must go through the mental process of comparing the indicated angle to the desired course and then resolving whether he ought to bear left or right. This requires concentration and practice. Furthermore, the helmsman's response may be erroneous, because the ever present ambiguity between error and the required correction may cause him to turn the wrong way. What is more, the helmsman's response is not likely to be as spontaneous as when he is reacting by reflex to steering commands.

A further disadvantage of these devices is that the on-course conditions are represented on the indicator by off-center pointer positions, typically at −30° (while on port tack) and 30 (on standard). The centered pointer position, which would be the logical choice for on-course, is associated with the unusable head to wind condition. This latter disadvantage is partially overcome in another prior art device which provides an adjustable control whereby the pointer may be biased to take a centered position while on-course. However, separate adjustments must be made for the port and starboard tacks with the outcome that the helmsman, or his crew, must reset this control each time the sailing vessel changes tacks.

SUMMARY OF THE INVENTION

Thus, in accordance with the broadest aspect of the invention, there is provided a device for providing to a helmsman of a sailing vessel an indication of deviations of the heading of the vessel from a selected angle with respect to the apparent wind on both port and starboard tacks comprising means for producing an electrical control signal having an amplitude proportional to deviations in angular position of a rotatable shaft from a central position, a wind vane mounted on said shaft and exposed to the wind whereby the angular position of said shaft is determined by said wind vane, dial means for setting said selected angle and for producing a reference electrical signal having an amplitude proportional to the selected angle, means for connecting the control signal and the reference signal in opposition through a meter having a pointer which produces an indication for the helmsman of any difference between them, sensing means for sensing port and starboard tacks and switching means responsive to said sensing means for reversing connections to the meter on port tacks as compared to starboard tacks so that a single dial setting results in correct meter readings on both port and starboard tacks.

The attainment of the above and further objects will become apparent from the following description of the preferred embodiments which are provided by way of example and not by way of limitation.

DESCRIPTION OF THE PREFERRED EMBODIMENT

Figure 1:
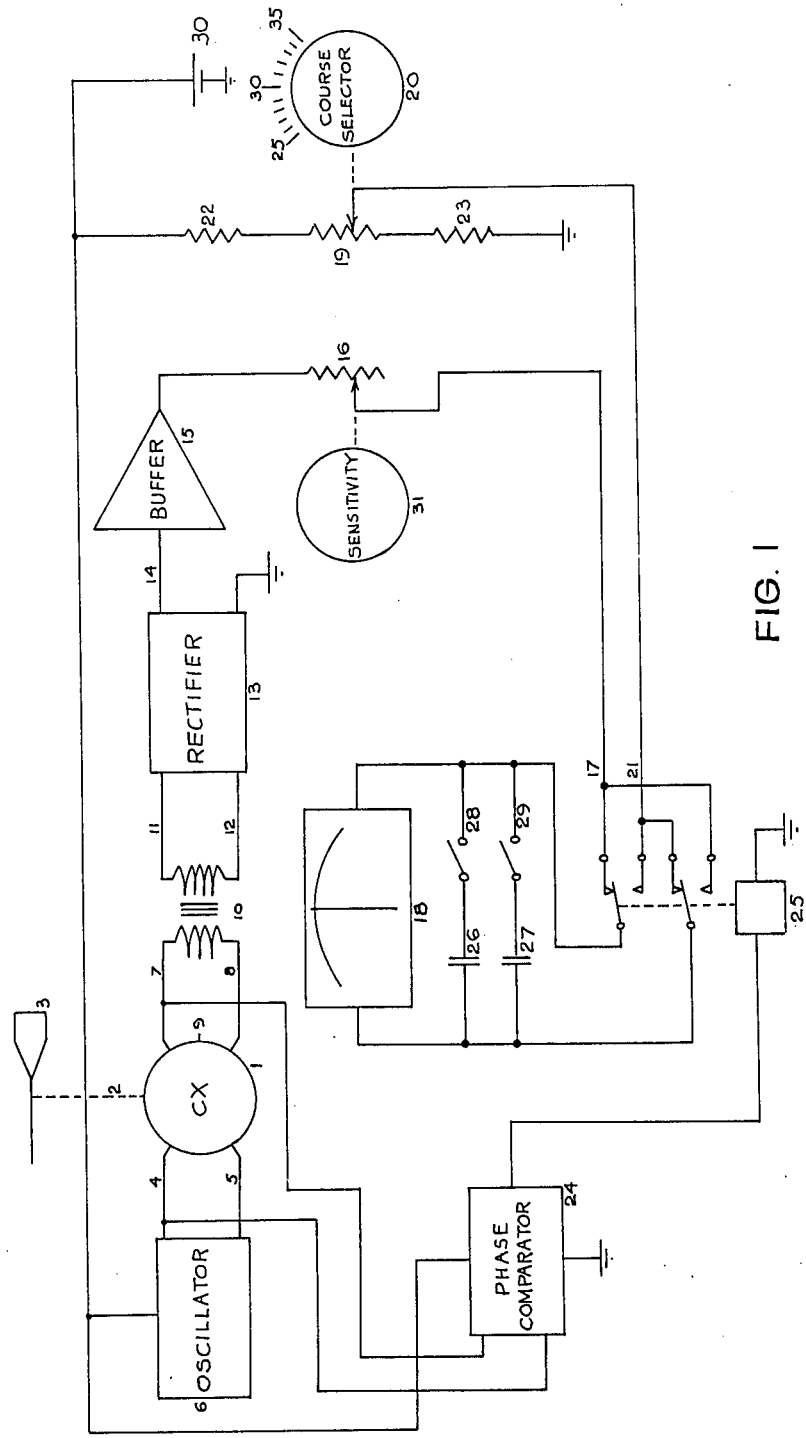
FIG. 1 is a schematic diagram showing the electrical and mechanical interaction of the basic elements of the invention.

Turning now to the drawings, in which like reference numerals represent like parts, reference numeral 1 designates an electrical synchro transmitter rigidly mounted at the top of the mast (not shown), and so oriented that its shaft 2 is vertical. The usual practice in outdoor installations of synchros, and related resolvers, is to protect them from rain by an inverted cup. This detail is well known to those skilled in the marine and meteorological arts and need not be shown here. For use in salt waters it may be advisable to specify a synchro meeting suitable military specifications for salt spray tests, or to use a synchro specifically designed for marine environments.

Figure 2:
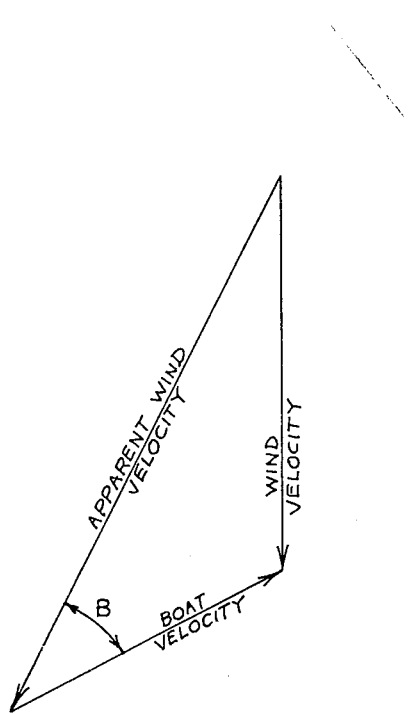
FIG. 2 is the triangle of velocity vectors showing Angle B, sensed by the wind vane.
Figure 3:
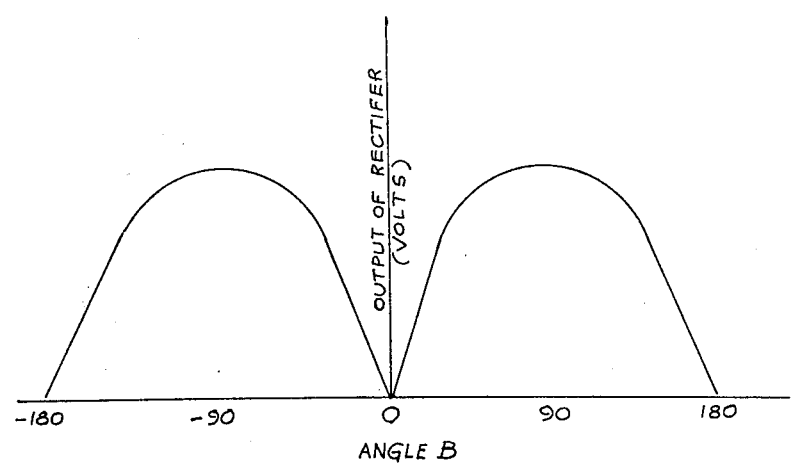
FIG. 3 represents the voltage waveform following rectification.

A wind vane 3 is rigidly attached to the shaft of the synchro taking advantage of the low friction bearings within the synchros. Thus the wind vane is free to orient itself parallel to even the lightest of winds, while positioning the synchro rotor to angle B, FIG. 2. For the best results the vane should be neutrally balanced to eliminate the effect of gravity when the sailing vessel heels.

A first winding means, e.g. the synchro rotor winding, is electrically excited via leads 4 and 5 by an electrical oscillator 6, the frequency of which is typically 60 Hertz or 400 Hertz depending on whether the synchro is to ground or aviation specifications. The output of the oscillator needs less power and voltage than normally used for driving synchros because in this embodiment of the invention a second winding means, e.g. the synchro stator winding, connected to a relatively high impedance followed by a stage of amplification. The oscillator may be made by suitably strapping the terminal leads of an integrated circuit such as the Signetics 555 timer. For simplicity of explanation it will be assumed that the wind vane is connected to the rotor of the synchro and that the stator is stationary although, as far as the electrical functioning of the synchro is concerned, the reverse could be true.

The angular position of the synchro rotor relative to the stator, that is the above mentioned Angle B, is electrically transmitted through the stator output leads 7 and 8 (lead 9 being left floating) to the primary of isolating transformer 10, the secondary of which is connected through leads 11 and 12 to rectifier 13. The output of the latter is fed via lead 14 to buffer amplifier 15 which may be made by suitably strapping the leads of an integrated circuit such as the Fairchild $\mu$A 741, the output of which is applied via optional variable resistor 16 and lead 17 to one terminal of indicator 18. The output of the buffer amplifier is opposed by an adjustable DC reference voltage produced in potentiometer 19, controlled by the Course Selector 20 and applied to the other terminal of the indicator, via lead 21. The indicator has a center zero scale and a DC microammeter movement, so that the pointer is at zero, symbolizing on-course, whenever the differential voltage at the indicator terminals is zero.

In review of the circuit described so far, and in accordance with synchro theory, the synchro output has an amplitude proportional to the sine function of Angle B; rectification produces a waveform symmetric with respect to B = 0, so that, following rectifications, the voltage analogues of sin (−B) and sin (B) are equal, enabling a single setting of the Course Selector to set the desired course for both tacks. To illustrate, let it be assumed that the helmsman expects that his maximum speed made good to windward is achieved when the sailing vessel is at an angle of 28° to apparent wind. He will then set the Course Selector to 28 and thereupon the indicator pointer will be centered, symbolizing on-course, whenever the sailing vessel is on either −28 (port tack) or 28 (starboard) relative to the apparent wind, the reason being that the analogues of sin (−28) and sin (28) being now equal would be balanced by a single setting of potentiometer 19.

A further advantage of this design in which a signal voltage and a reference voltage are applied differentially to the indicator, is that both decrease linearly with dropping battery voltage and therefore the accuracy of the on-course indication is relatively unaffected by low battery voltage.

Resistors 22 and 23 serve to limit the range of adjustments of the Course Selector thereby offering better angular resolution. In FIG. 1, the range of adjustment is 25° to 35°, which is likely to be sufficiently wide to include all types of modern sailing vessels. This range is offered by way of an example only and may be easily altered by changing the relative proportions of the resistors and of potentiometer 19. One interesting alternative is to expand the range, or to provide a second set of resistors, switched-in in lieu of 22 and 23 by a mode selector switch (not shown), to include the range of angles of interest when tacking downwind.

Figure 4:
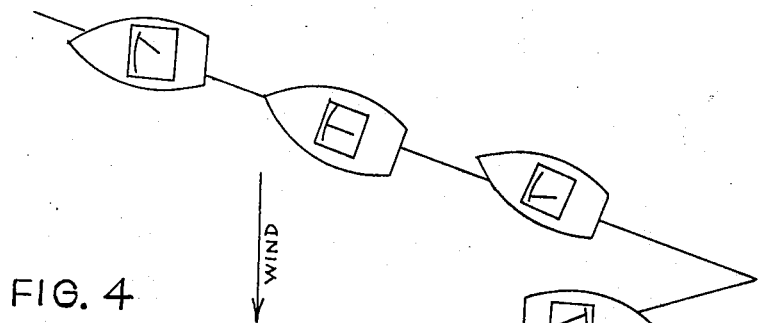
FIG. 4 shows the follow-the pointer mode of operation.

Whenever the sailing vessel is on a course other than the course preset on the Course Selector, a condition of unbalance results and the pointer deflects from center. In the preferred embodiment of the invention the pointer is made to deflect into the direction of the required turn. By following the pointer correctly the helmsman brings the vessel back to oncourse, as shown in FIG. 4. The circuit, described so far, would cause the pointer to deflect correctly, in the follow the pointer manner, on one tack only, with opposite deflections on the other. It is therefore necessary to reverse the polarity of deflection on this latter tack. This is done by the phase comparator 24 which compares a variable phase (synchro output) to a reference phase (oscillator output). The two phases are in-phase on one tack and opposite on the other and therefore the phase comparator serves to detect the tack, port or starboard, of the sailing vessel. This is used to control relay 25 which serves to reverse the polarity of pointer deflections by reversing leads 17 and 21 as required to retain the follow the pointer manner of presentation on both tacks. A further advantage of polarity reversal is that it occurs precisely when Angle B is 0, that is when the sailing vessel is head to wind causing the pointer to fluctuate widely at which time the reading of the onboard compass gives an accurate wind direction.

Figure 5:
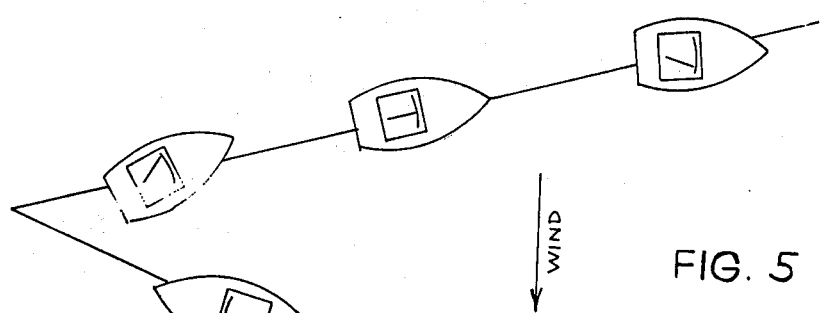
FIG. 5 shows the mode of operation when the pointer deflects into the direction of the course error.

In another embodiment of the invention leads 17 and 21 may be reversed or switched through a mode selector switch (not shown) to cause the pointer to deflect in the direction of the course error as shown in FIG. 5. By correctly steering away from the pointer the helmsman brings the sailing vessel back to on-course.

Figure 6:
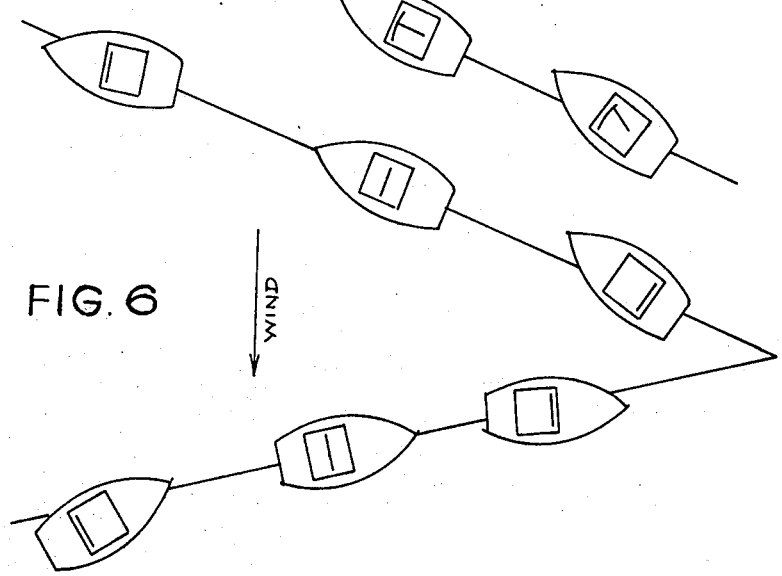
FIG. 6 shows the mode of operation when a horizontal pointer is used to provide sail higher/sail lower commands.

In yet another embodiment of the invention the phase comparator and the relay may be deleted or by-passed, through a mode selector switch (not shown), to effect a mode of pointer deflection consistent with the sail higher/sail lower principle with which all sailors are familiar. If this manner of pointer deflection is preferred it may be desirable to choose an indicator with a pointer deflecting up and down from a center neutral position as shown in FIG. 6. By correctly following the pointer the helmsman brings the vessel back to on-course.

The gain available from the buffer amplifier and the indicator's sensitivity are such that full scale deflection of the pointer may be produced by a course error of a fraction of a degree. However, depending on personal preferences, this high degree of pointer sensitivity may not be desired. Therefore, though not essential to the implementation of the invention, it may be desirable to provide a Sensitivity Control. This may be done through a variable resistor in the feedback loop of the buffer amplifier or, as shown in FIG. 1, by way of a variable resistor 16 in series with the indicator and adjustable through the Sensitivity Knob 31, which may be calibrated if desired.

Likewise, it may be desirable but not essential to provide an adjustment of the amount of damping of the pointer to slow it down to rates to which the helmsman and the sailing vessel may respond. This may be done as shown in FIG. 1 by switching-in capacitors 26 and/or 27 in parallel with the indicator by the means of switches 28 and 29. Battery 30 may be a 9 Volt transistor radio battery.

In operable apparatus there is included appropriate on-off switching, lighting, battery test, indicator current limiters and suitable packaging.

In another embodiment of the invention a resolver may be used in lieu of the synchro with the added advantage of providing an additional output of the cosine functions of Angle B which may be required for onboard computations of a complexity exceeding the present invention. It will be obvious that other types of indicating means may be used to indicate the on-course conditions and to provide steering commands, by communicating to the helmsman through any one or several of the human senses. Use of audio tones, or A and N Morse codes, or displays visible through peripheral vision would be the more obvious choices.

By way of a summary it will be seen that the invention described herein provides steering commands, the sensitivity and damping of which may be adjusted, with on-course being represented by a centered presentation. In normal use the skipper will adjust sensitivity and damping to enable him to hold the desired course as accurately as possible and when the vessel deviates to bring it back on-course, as fast as possible without overshoot and without overly violent rudder movements. Should it be desired to measure the angle of the relative wind, the sensitivity control may be set to maximum to achieve the best resolution and the Course Selector adjusted to null the indicator whereupon the desired angle may be read from the setting of the Course Selector.

From the described embodiment of the invention and the outlined alternative embodiments it will be readily apparent to those skilled in the art of instrumentation and in sailing how the various objects and advantages are attained and how various modifications and changes can be made without departure from the spirit of the invention, the scope of which is commensurate with the appended claims.

What I claim as my invention is:

1. A device for providing to a helmsman of a sailing vessel an indication of deviations of the heading of the vessel from a selected angle with respect to the apparent wind on both port and starboard tacks comprising means for producing an electrical control signal having an amplitude proportional to deviations in angular position of a rotatable shaft from a central position, a wind vane mounted on said shaft and exposed to the wind whereby the angular position of said shaft is determined by said wind vane, dial means for setting said selected angle and for producing a reference electrical signal having an amplitude proportional to the selected angle, means for connecting the control signal and the reference signal in opposition through a meter having a pointer which produces an indication for the helmsman of any difference between them, sensing means for sensing port and starboard tacks and switching means responsive to said sensing means for reversing connections to the meter on port tacks as compared to starboard tacks so that a single dial setting results in correct meter readings on both port and starboard tacks.

2. A device as claimed in claim 1 wherein the meter is connected so that deflections of the pointer indicate what direction the helmsman must steer to bring the vessel to a heading at said selected angle.

3. A device as claimed in claim 1 wherein the meter is connected so that deflections of the pointer indicate what direction the heading of the vessel is in error with respect to said selected angle.

4. A device as claimed in claim 1 wherein said means for producing an electrical control signal comprises a synchro transmitter having a first winding means excited by an oscillator and a second winding means connected to a primary winding of a transformer, said transformer having a secondary winding connected to an input of a rectifier, said rectifier having an output connected via an amplifier and said switching means to a terminal of said meter.

5. A device as claimed to claim 4 wherein a variable resistor, comprising a sensitivity control, is connected in series with the amplifier.

6. A device as claimed in claim 5 wherein the means for producing the reference electrical signal comprises a DC source in series with a variable resistance which comprises a course selector.

7. A device as claimed in claim 6 wherein the sensing means comprises a phase comparator having a first input to which is connected the output of the oscillator and a second input to which is connected the second winding means of the synchro, said phase comparator having an output connected to said switching means.

8. A device as claimed in claim 7 wherein said switching means comprises a relay.

* * * * *